US012692427B2

(12) United States Patent
Barnes et al.

(10) Patent No.: US 12,692,427 B2
(45) Date of Patent: Jul. 28, 2026

(54) SYSTEMS AND METHODS FOR SCAVENGING SULFUR-CONTAINING MATERIALS USING A PRECURSOR SCAVENGER MATERIAL

(71) Applicant: Cameron International Corporation, Houston, TX (US)

(72) Inventors: Paul Barnes, Aberdeen (GB); Alyn Jenkins, Aberdeen (GB); Tore Nordvik, Stavanger (NO); Rolando Perez Pineiro, Nisku (CA); Jody Hoshowski, Nisku (CA)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 19/182,667

(22) Filed: Apr. 18, 2025

(65) Prior Publication Data

US 2025/0320402 A1 Oct. 16, 2025

(51) Int. Cl.
E21B 41/02 (2006.01)
C09K 8/54 (2006.01)

(52) U.S. Cl.
CPC ................ C09K 8/54 (2013.01); E21B 41/02 (2013.01); *C09K 2208/20* (2013.01)

(58) Field of Classification Search
CPC ................................. C09K 8/54; E21B 41/02

USPC ......................................................... 166/304
See application file for complete search history.

(56) References Cited

U.S. PATENT DOCUMENTS

| | | | | |
|---|---|---|---|---|
| 7,902,124 B2 * | 3/2011 | Ali | ............................ | C11D 1/90 |
| | | | | 166/305.1 |
| 9,018,141 B2 | 4/2015 | Kolari | | |
| 2012/0142563 A1 * | 6/2012 | Cassidy | .................... | C09K 8/74 |
| | | | | 507/244 |
| 2015/0275067 A1 * | 10/2015 | Kabbani | .................. | C09K 8/03 |
| | | | | 507/214 |

* cited by examiner

*Primary Examiner* — William D Hutton, Jr.
*Assistant Examiner* — Ashish K Varma
(74) *Attorney, Agent, or Firm* — Kyle R. Miiller

(57) ABSTRACT

A method for applying a scavenger material to a wellbore includes providing a precursor scavenger material to a location within a wellbore extending through an earth formation, the precursor scavenger material comprising an acetal or a hydroxyaldehyde, reacting the precursor scavenger material in the wellbore or the earth formation in-situ to form a scavenger material comprising propenal, and reacting the scavenger material with at least one of hydrogen sulfide or a mercaptan to reduce a concentration of the at least one of hydrogen sulfide or the mercaptan. Related methods and systems for applying the scavenger material to the wellbore are also disclosed.

15 Claims, 8 Drawing Sheets

SYSTEMS AND METHODS FOR SCAVENGING SULFUR-CONTAINING MATERIALS USING A PRECURSOR SCAVENGER MATERIAL

CROSS REFERENCE TO RELATED APPLICATION

N/A.

FIELD

The present disclosure generally relates to scavengers, for example as used in the oil and gas industry, and more particularly to use of scavengers for sulfur-containing materials for use in a wellbore. In particular, the present disclosure relates to methods and systems for forming a hydrogen sulfide and mercaptan scavenger in-situ in a wellbore or earth formation for reducing the concentration of hydrogen sulfide or mercaptans in the wellbore system.

BACKGROUND

Many oilfield operations include the circulation of a fluid into and/or through a borehole or wellbore. Such fluids may include drilling fluids that are circulated during the drilling of the well, completion fluids that are circulated during or after drilling, and fracturing fluids which are used after drilling to stimulate the well to increase production from a hydrocarbon reservoir.

After a well is drilled into a subterranean earth formation that contains hydrocarbons (e.g., oil, natural gas) and/or water, one or more operations may be performed to increase the production of the hydrocarbons. To increase the permeability and flow of the formation fluids to the surface, the wells are often subjected to stimulation operations. Stimulation generally refers to several post drilling processes used to clean the wellbore, enlarge channels, and increase pore space of the earth formation in the region (zone) of the earth formation to be injected, increasing the permeability of that region of the earth formation.

During production operations in which hydrocarbons or other materials are produced from the wellbore (e.g., from a subterranean formation), the wellbore and wellbore equipment may be exposed to various corrosive liquids and gases. For example, produced fluids may include hydrogen sulfide and thiols (also known as mercaptans), such as methanethiol, which may be corrosive and damage the wellbore and wellbore equipment. In addition to corrosion issues, the hydrogen sulfide and thiols may be hazardous to wellbore workers and are also considered environmental pollutants. For example, mercaptans are rapidly absorbed through inhalation and through skin and eye contact and lead to adverse health consequences. In addition, hydrogen sulfide, even at very low concentrations, can be fatal.

Current methods of scavenging wellbore fluids for hydrogen sulfide and mercaptans include introducing scavenger materials including formaldehyde-based scavengers, organic scavenger materials, triazine-based materials (e.g., hexahydro-1,3,5-tris(hydroxyethyl)-s-triazine), monoethanolamine (MEA) triazine, glyoxal-based scavenger materials, metal-based scavengers (e.g., iron salts, zinc salts), or chelating agents. However, such scavenging materials may form non-volatile byproducts that may cause fouling and blockage, may have limited efficiencies at high sulfide (e.g., hydrogen sulfide) loadings, may cause corrosion, may have environmental concerns, may have compatibility issues with emulsions in the wellbore, may have poor reaction kinetics under wellbore conditions, may not be compatible with other materials located in the wellbore, such as scale inhibitors, biocides, and demulsifiers, and may have high cost.

BRIEF SUMMARY

In some configurations, a method for applying a scavenger material to a wellbore comprises providing a precursor scavenger material to a location within a wellbore extending through an earth formation, the precursor scavenger material comprising an acetal or a hydroxyaldehyde, reacting the precursor scavenger material in the wellbore or the earth formation in-situ to form a scavenger material comprising propenal, and reacting the scavenger material with at least one of hydrogen sulfide or a mercaptan to reduce a concentration of the at least one of hydrogen sulfide or the mercaptan.

In some embodiments, a method of applying a scavenger material to a wellbore comprises providing a precursor scavenger material to a location within a wellbore extending through an earth formation, the precursor scavenger material comprising at least one of acrolein diethyl acetal, acrolein ethylene glycol acetal, or 3-hydroxypropanal, responsive to exposure to an acid or water in the wellbore, forming a scavenger material comprising propenal in the wellbore from the precursor scavenger material, measuring a concentration of a sulfur-containing species associated with the wellbore, and adjusting a flowrate of the precursor scavenger material based on the measured concentration of the sulfur-containing species at a downhole location.

In some embodiments, a system for providing a scavenger material to a wellbore comprises an injection pump in fluid communication with a precursor scavenger material, the precursor scavenger material comprising an acetal or a hydroxyaldehyde, and wellbore piping in fluid communication with the injection pump and configured to provide the precursor scavenger material to a downhole location.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 2A is a simplified schematic illustrating a reaction scheme for forming a precursor scavenger material from propenal and an alcohol, according to at least one embodiment of the disclosure;

FIG. 2B is a simplified schematic illustrating a reaction scheme for forming the precursor scavenger material from propenal and ethanol, according to at least one embodiment of the disclosure;

FIG. 2C is a simplified schematic illustrating a reaction scheme for forming the precursor scavenger material from propenal and a diol, according to at least one embodiment of the disclosure;

FIG. 2D is a simplified schematic illustrating a reaction scheme for forming propenal in-situ downhole from acrolein diethyl acetal, according to at least one embodiment of the disclosure;

FIG. 2E is a simplified schematic of a reaction scheme for reaction between propenal and hydrogen sulfide, which may occur within the wellbore, in accordance with at least one embodiment of the disclosure;

DETAILED DESCRIPTION

This disclosure generally relates to scavenger materials for sulfur-containing materials, and to related methods of treating a wellbore or a wellbore fluid (e.g., a produced fluid) for one or more sulfur-containing materials. A precursor scavenger material may be formulated and configured to form a scavenger material in-situ in a wellbore or an earth formation through which the wellbore extends. The in-situ formed scavenger material may be formulated and configured to scavenge (e.g., remove, react with to form another material) with sulfur-containing species, such as hydrogen sulfide or mercaptans, in the earth formation and/or the wellbore extending through the earth formation. In some embodiments, the precursor scavenger material is formulated and configured to hydrolyze when exposed to wellbore conditions to form the scavenger material downhole (e.g., in the wellbore or in the earth formation). In other embodiments, the precursor scavenger material is formulated and configured to dehydrate (e.g., release water) when exposed to the wellbore conditions to form the scavenger material. The scavenger material may be more reactive with sulfur-containing materials than the precursor scavenger material. In other words, the scavenger material formed in-situ downhole may be more effective at reacting with sulfur-containing materials (e.g., hydrogen sulfide, mercaptans) than the precursor scavenger material.

In some embodiments, the precursor scavenger material is formulated and configured to react to form the scavenger material responsive to exposure to acidic conditions, such as a pH less than about 6.5 or less than about 6.0. In some embodiments, the precursor scavenger material is formulated and configured to form the scavenger material responsive to exposure to an acid (e.g., carbonic acid) within the wellbore and/or responsive to exposure to water in the wellbore.

The precursor scavenger material may be easier to handle, may pose fewer health risks, and may be more environmentally friendly than the scavenger material that is formed downhole. The precursor scavenger material may not be as reactive in ambient conditions prior to introducing the precursor scavenger material to the wellbore than the scavenger material. Since the precursor scavenger material does not react when exposed to ambient conditions, the precursor scavenger material may be used to form more reactive scavenger materials while reducing health hazards and personnel exposure of wellbore workers since the scavenger materials are not formed until the precursor scavenger material is downhole. Accordingly, the precursor scavenger material may facilitate using scavenger materials that have heretofore not been used or that pose significant risks due to their reactivity or other properties.

Figure 1:
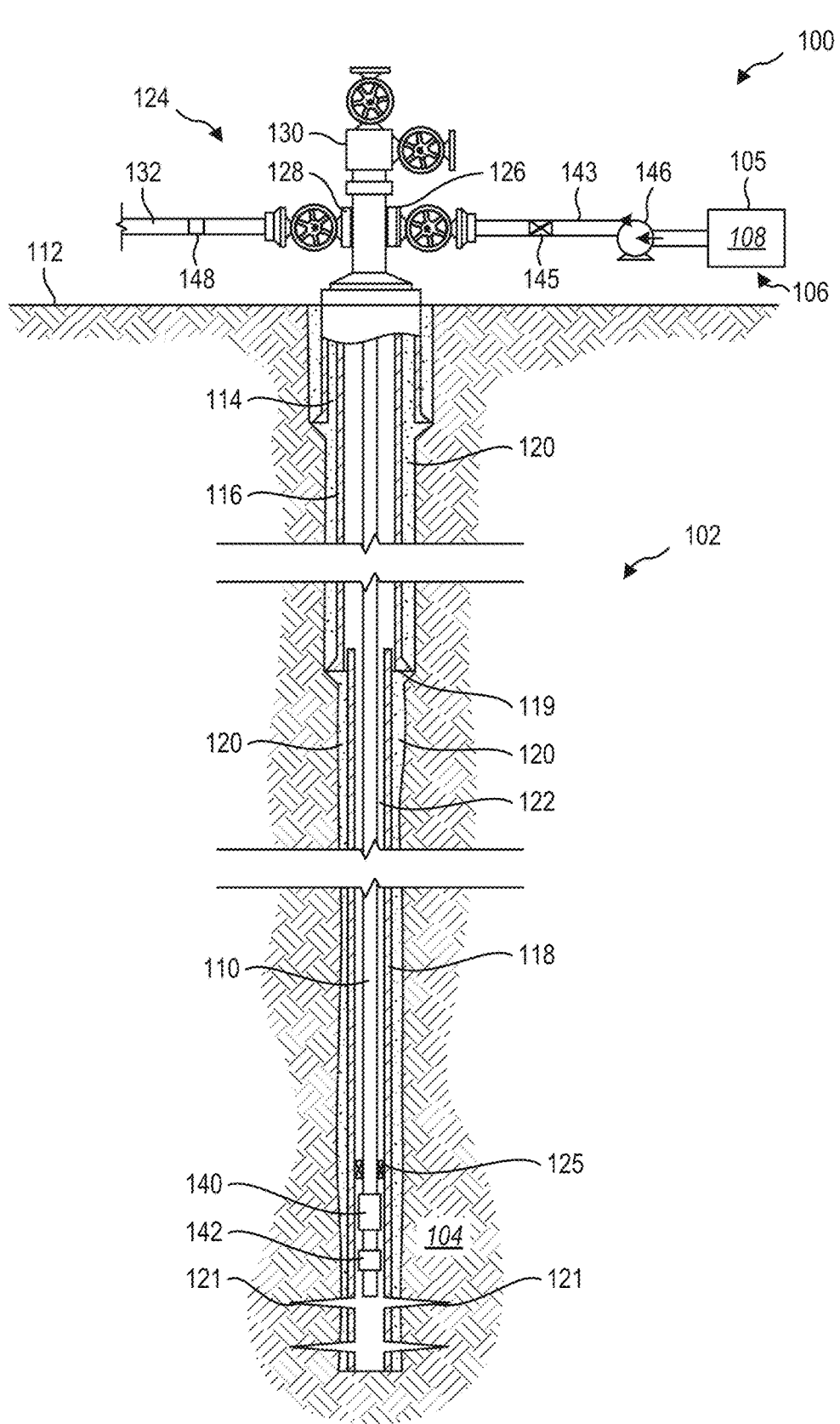
FIG. 1 is a simplified schematic of a wellbore system including a wellbore extending through an earth formation and a scavenger application system, according to at least one embodiment of the disclosure.

FIG. 1 is a simplified schematic of a wellbore system 100 including a wellbore 102 extending through an earth formation 104, according to at least one embodiment of the disclosure. The wellbore system 100 includes a sulfur-containing scavenger material application system 106 (also referred to as a "scavenger" system) configured to provide a precursor scavenger material 108 to one or more portions of the wellbore system 100, for example, based on a concentration of one or more sulfur-containing species in wellbore 102 and/or the earth formation 104. As described herein, the sulfur-containing scavenger material application system 106 may be configured to provide a precursor scavenger material 108 (also referred to as a "precursor sulfur-containing species scavenger," a "precursor hydrogen sulfide scavenger," or a "precursor scavenger") to a downhole location, such as to the wellbore 102 and/or the earth formation 104. The precursor scavenger material 108 may be formulated and configured to react downhole (e.g., within the wellbore 102, within the earth formation 104) to form a scavenger material (also referred to as a "sulfur-containing species scavenger," a "hydrogen sulfide scavenger," a "scavenger," or an "in-situ formed scavenger") configured to react with a sulfur-containing species to reduce a concentration of the sulfur-containing species in the wellbore 102, a wellbore fluid, or the earth formation 104.

The wellbore 102 may extend through one or more reservoirs (e.g., hydrocarbon-containing reservoirs, water reservoirs) located within the earth formation 104. For example, the wellbore 102 may extend through one or more hydrocarbon-containing zones of the earth formation 104. As illustrated in FIG. 1, the wellbore 102 may be completed with a series of pipe strings extending through the earth formation 104, which may be referred to as a casing or a liner. The liners may include, for example, a surface casing 114, an intermediate casing 116, and a production casing 118

(also referred to as a "production string" or "production liner"). The wellbore 102 may further include a conductor casing located above (e.g., closer to the surface 112) the surface casing 114. Each of the conductor casing, the surface casing 114, the intermediate casing 116, and the production casing 118 may be secured to sidewalls of the earth formation 104 defining the wellbore 102 with cement 120. Production tubing 110 may extend within the production casing 118 and may be configured to provide one or more chemicals (e.g., precursor scavenger material 108) to the wellbore 102. The production tubing 110 may further be configured to provide one or more produced fluids to a surface 112. The production tubing 110 and the production casing 118 may define an annulus 122 (also referred to as an "annular region") between outer surfaces of the production tubing 110 and inner surfaces of the production casing 118 through which one or more fluids (e.g., wellbore fluids, produced fluids) may flow to and/or from the surface 112.

The production casing 118 may be hung from the intermediate casing 116 with a liner hanger 119. The production casing 118 may extend into the earth formation 104 more than the production tubing 110. In some embodiments, the production casing 118 is perforated. Perforations 121 may be in fluid communication with the earth formation 104 and may be configured to facilitate the flow of fluid (e.g., produced fluids) from the earth formation 104, through the perforations 121 to the inner diameter of the production casing 118. A production packer 125 may be disposed between the production tubing 110 and the production casing 118. The production packer 125 may be configured to seal the annulus 122 between the production tubing 110 and the production casing 118.

The wellbore system 100 may include a wellhead 124 located above the surface 112. The wellhead 124 may include a so-called "Christmas tree" including piping and connections (e.g., valves) for operating the wellbore system 100. The wellhead 124 may be configured to facilitate the flow of fluids (e.g., wellbore fluids, produced fluids, stimulation fluids, fracturing fluids) to and from the wellbore 102. For example, the wellhead 124 may include a first valve 126, a second valve 128, and a third valve 130. Each of the first valve 126, the second valve 128, the third valve 130 may be sealed and in fluid communication with one or more of the surface casing 114, the intermediate casing 116, the production casing 118, and/or the production tubing 110. Accordingly, the production tubing 110 and the production casing 118 are in fluid communication with the wellhead 124. For example, one or more fluids may flow to and/or from the wellbore 102 through the production tubing 110 and/or through the annulus 122 between the production tubing 110 and the production casing 118. In some embodiments, the production tubing 110 is configured to provide produced fluids (e.g., hydrocarbons (e.g., oil, gas), water, brine) to piping 132 in fluid communication with the one of the valves, such as the second valve 128. At least one of the valves, such as the third valve 130, may be in fluid communication with one or more fluids that may be provided to the wellbore 102, such as one or more wellbore fluids, stimulation fluids, fracturing fluids, treatment fluids, or other fluids formulated and configured to facilitate one or more wellbore operations.

In some embodiments, the wellbore system 100 further includes an electric submersible pump 140 configured to provide one or more chemicals to the wellbore 102 and/or to facilitate the flow of produced fluids to surface piping. For example, the electric submersible pump 140 may be configured to provide the precursor scavenger material 108 to the wellbore 102, such as through the wellhead 124 and through one or both of the production tubing 110 and the production casing 118.

In some embodiments, one or more sensors 142 may be located within the wellbore 102 and configured to measure one or more properties or conditions within the wellbore 102. In some embodiments, the sensor 142 is configured to measure a concentration of at least one of one or more sulfur-containing species in the wellbore 102, a concentration of the scavenger material, or a concentration of the precursor scavenger material 108. The concentrations measured by the one or more sensors 142 may be of a fluid proximate the production tubing 110, the production casing 118, and/or proximate wellbore equipment. In some embodiments, the sensor 142 is configured to measure a concentration of hydrogen sulfide and mercaptans. In some embodiments, the sensor 142 comprises an inline hydrogen sulfide sensor. In some embodiments, the sensor 142 is configured to measure the concentration of the precursor scavenger material 108. The sensor 142 may be configured to measure the concentration of the sulfur-containing material in a fluid, which may be a liquid, a gas, or a combination thereof. In some embodiments, the one or more sensors 142 are configured to measure a concentration of the precursor scavenger material 108.

With continued reference to FIG. 1, the precursor scavenger material 108 may be in fluid communication with the wellbore 102, such as through piping 143 in fluid communication with the tank 105 including the precursor scavenger material 108. A valve 145 and a pump 146 may be configured to control a flowrate of the precursor scavenger material 108 from the tank 105 to the wellbore 102, such as through the first valve 126 and the wellhead 124 to the annulus 122 and/or the production tubing 110. In some embodiments, the wellbore system 100 includes coiled tubing, such as within the production tubing 110, for providing the precursor scavenger material 108 to the wellbore 102.

In some embodiments, the wellbore system 100 further includes a sensor 148 configured to measure a concentration of at least one of one or more sulfur-containing species in the wellbore 102, a concentration of the scavenger material, or a concentration of the precursor scavenger material 108 in a produced fluid. The sensor 148 may be located above the surface 112, for example, such as in the piping 132 in fluid communication with the second valve 128. In some embodiments, the sensor 148 is configured to measure a concentration of one or more sulfur-containing species in the produced fluid, which may facilitate determining whether to increase or decrease a flowrate of the precursor scavenger material 108. For example, responsive to determining that a concentration of the sulfur-containing species in the produced fluid is greater than a predetermined threshold concentration, the sulfur-containing scavenger material application system 106 may cause a flowrate of the precursor scavenger material 108 to be increased; and responsive to determining that the concentration of the sulfur-containing species in the produced fluid is less than the predetermined threshold concentration, the sulfur-containing scavenger material application system 106 may cause a flowrate of the precursor scavenger material 108 to be decreased.

A flowrate of the precursor scavenger material 108 to be provided to the wellbore 102 may be determined based, at least in part, on sensor data from the sensor 142 and/or the sensor 148, which may correspond to a concentration of sulfur-containing materials in the wellbore 102, proximate wellbore equipment, and/or within the earth formation 104.

For example, the flowrate and/or concentration of the precursor scavenger material 108 may be determined based on the concentration of the sulfur-containing species measured by the sensor 142; and/or by the concentration of the sulfur-containing species in the produced fluid measured by the sensor 148.

The precursor scavenger material 108 may include one or more materials formulated and configured to react downhole (e.g., within the wellbore 102, within the earth formation 104) to form a scavenger material in-situ. The scavenger material may be formulated and configured to react with one or more sulfur-containing species downhole to scavenge (e.g., capture, bind) the sulfur-containing species. In other words, the scavenger material may be configured to reduce a concentration of the sulfur-containing species. The sulfur-containing species may include hydrogen sulfide, mercaptans (e.g., having the formula R—SH, wherein R is a methyl group, an ethyl group, a propyl group, a butyl group), or a combination thereof. Mercaptans may include, for example, one or more of methanethiol ($CH_3SH$), ethanethiol ($C_2H_5SH$), propane-1-thiol ($C_3H_7SH$), or butanethiol ($C_4H_9SH$), benzyl mercaptan ($C_6H_5CH_2SH$), thiophenol ($C_6H_5SH$), or another thiol.

In some embodiments, the precursor scavenger material 108 is formulated and configured to form the scavenger material responsive to exposure to one or more acids or acidic conditions downhole. In some embodiments, responsive to exposure to a pH lower than about 6.5, such as lower than about 6.0, the precursor scavenger material 108 may hydrolyze to form the active scavenger material. In some embodiments, responsive to exposure to an acid, such as carbonic acid, the precursor scavenger material 108 may be formulated and configured to form the scavenger material. In some embodiments, responsive to exposure to water, the precursor scavenger material 108 may be formulated and configured to form the scavenger material.

The precursor scavenger material 108 may include an acetal having the general formula $R_1CH(OR_2)(OR_3)_2$, wherein $R_1$ is an organic group or hydrogen, and each of $R_2$ and $R_3$ are individually an organic group. In some embodiments, the acetal is linear or branched. In some embodiments, the acetal is cyclic wherein the acetal carbon atom is part of a ring structure. In some embodiments, the precursor scavenger material 108 comprises a hydroxy carbonyl compound. In some embodiments, the precursor scavenger material 108 comprises a hydroxyaldehyde (e.g., having the general formula R—CH(OH)—CHO, wherein R is an alkyl group or hydrogen). In some embodiments, the precursor scavenger material 108 comprises an aldol comprising a structure including a hydroxy group (—OH) two carbons away from an aldehyde or a ketone carbon atom. In some embodiments, the hydroxy carbonyl compound comprises 3-hydroxypropanal. The precursor scavenger material may be formulated and configured to react in-situ downhole to form an unsaturated aldehyde.

In some embodiments, the precursor scavenger material 108 comprises an acetal. The precursor scavenger material 108 may include a reaction product of propenal (also known as acrolein) and at least one alcohol. In some embodiments, the precursor scavenger material 108 includes a reaction product of propenal and a diol. In some embodiments, the precursor scavenger material 108 includes a reaction product of propenal and an alcohol and comprises an acetal. The acetal may have the general formula $R_1CH(OR_2)(OR_3)_2$, wherein $R_1$ is an organic group or hydrogen, and each of $R_2$ and $R_3$ are an organic group. The composition of $R_2$ and $R_3$ may depend on the alcohol(s) used to form the precursor scavenger material 108. Accordingly, each of $R_2$ and $R_3$ may be the same, or $R_2$ and $R_3$ may be different, and may depend on the alcohol used to form the precursor scavenger material 108. For example, where the precursor scavenger material 108 is formed from a single alcohol (e.g., a high purity alcohol, an alcohol including one composition), each of $R_2$ and $R_3$ may be the same. In embodiments where the precursor scavenger material 108 is formed from an alcohol mixture including more than one alcohol, each of the R' groups may be different.

Figure 2A:
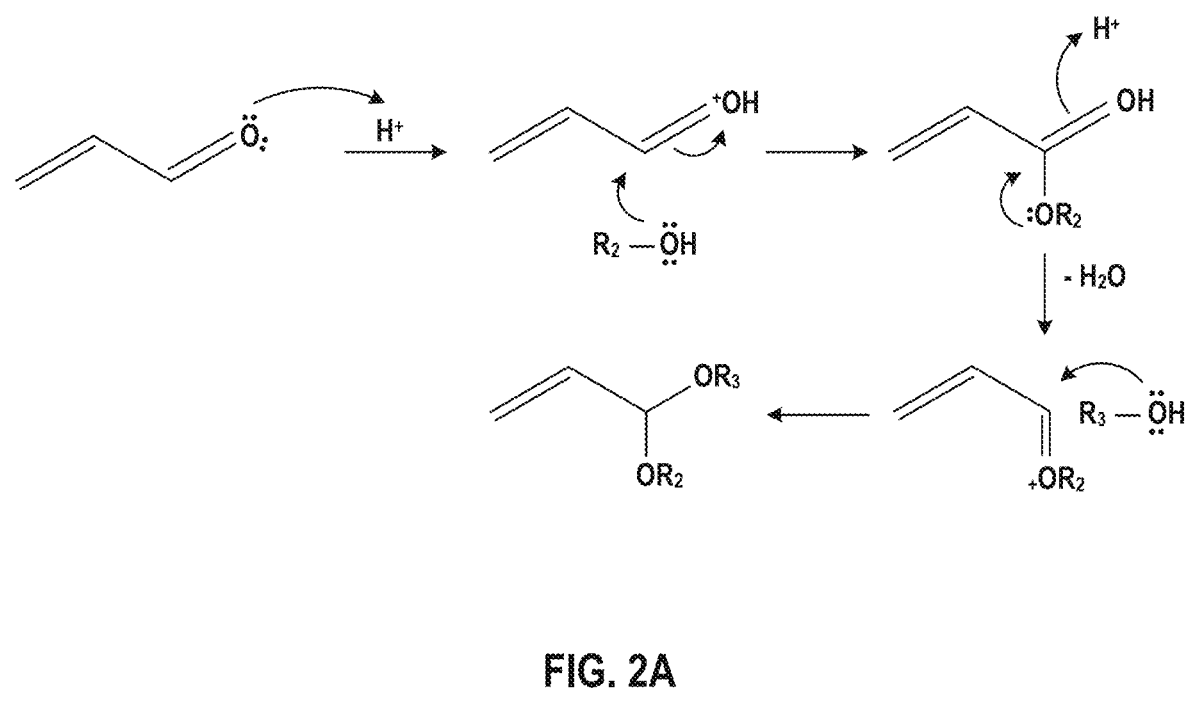

In some embodiments, the precursor scavenger material 108 is formed by reacting each molecule of propenal with two molecules of an alcohol and the molecules of the alcohol may be the same or may be different. FIG. 2A is a simplified schematic illustrating a reaction scheme for forming the precursor scavenger material 108 from propenal and an alcohol, according to at least one embodiment of the disclosure. With reference to FIG. 2A, propenal may react with a first alcohol molecule ($R_2$—OH) under acidic conditions. Hydrogen ions may protonate the aldehyde carbonyl, increasing the electrophilicity thereof. The protonation of the aldehyde carbonyl may enhance the reactivity of the aldehyde towards nucleophilic addition by an alcohol to form a hemiacetal intermediate. The hemiacetal intermediate may be protonated at the hydroxyl group to form water by dehydration of the hemiacetal and an electrophilic oxonium group that may react with a second alcohol ($R_3$—OH) to yield the acetal precursor scavenger material 108. The precursor scavenger material 108 may include an acetal having the formula $CH_2CHCH(OR_2)(OR_3)$. In some embodiments, the precursor scavenger material 108 includes an acetal material including an R group including a terminal unsaturated bond (a terminal carbon to carbon double bond), as shown in FIG. 2A.

With continued reference to FIG. 2A, each of $R_2$ and $R_3$ may individually include a $C_1$ to $C_{20}$ carbon group. The $C_1$ to $C_{20}$ carbon groups may individually be linear or branched. In addition, the $C_1$ to $C_{20}$ carbon groups may individually be saturated or may be unsaturated (e.g., include one or more unsaturated bonds, such as monounsaturated, di-unsaturated, tri-unsaturated, etc.). In some embodiments, each of $R_2$ and $R_3$ are the same. In other embodiments, $R_2$ and $R_3$ are different. For example, each of $R_2$ and $R_3$ may individually include a methyl group (—$CH_3$), an ethyl group (—$CH_2CH_3$), a propyl group (—$CH_2(CH_3)_2$), a butyl group (—$CH_2(CH_3)_3$), a pentyl group (—$CH_2(CH_3)_4$), a hexyl group, a heptyl group, an octyl group, a nonyl group, a decyl group, or another group.

Figure 2B:
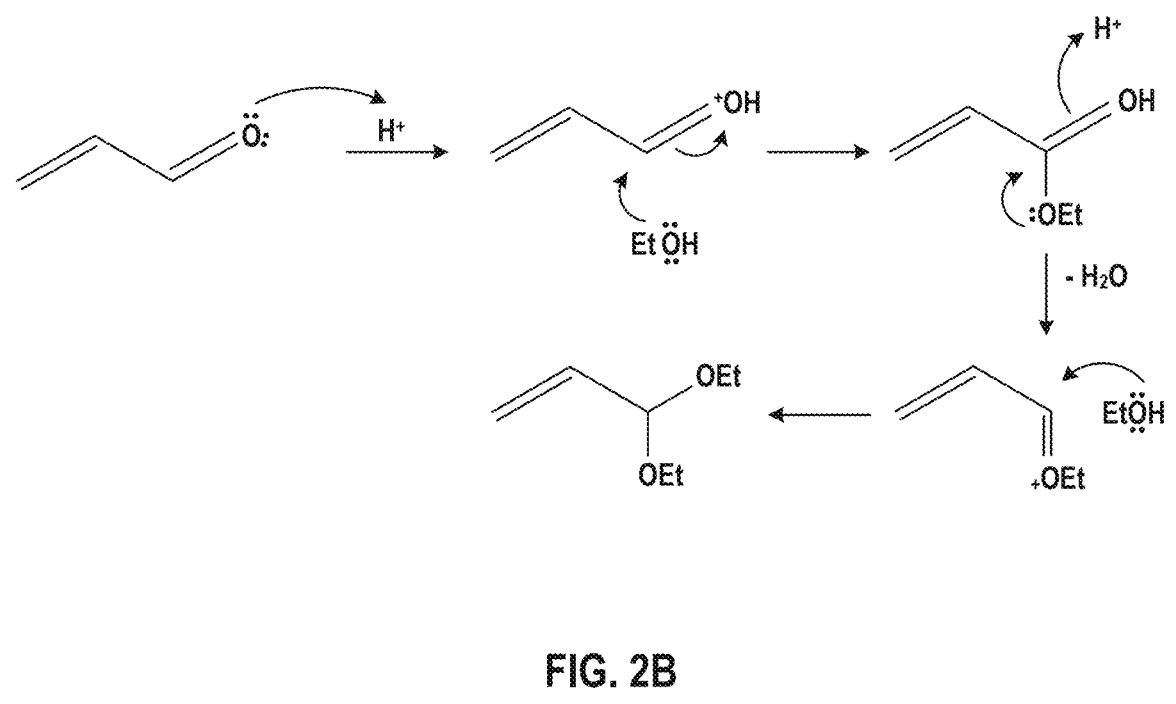

In some embodiments, each of $R_2$ and $R_3$ are the same. FIG. 2B is a simplified schematic illustrating a reaction scheme for forming the precursor scavenger material 108 from propenal and ethanol, according to at least one embodiment of the disclosure. In particular, in FIG. 2B, each of $R_2$ and $R_3$ from FIG. 2A are ethyl groups (—$CH_2CH_3$, represented as "Et" in FIG. 2B). The resulting acetal is acrolein diethyl acetal. Accordingly, in some embodiments, the precursor scavenger material 108 comprises acrolein diethyl acetal.

Figure 2C:
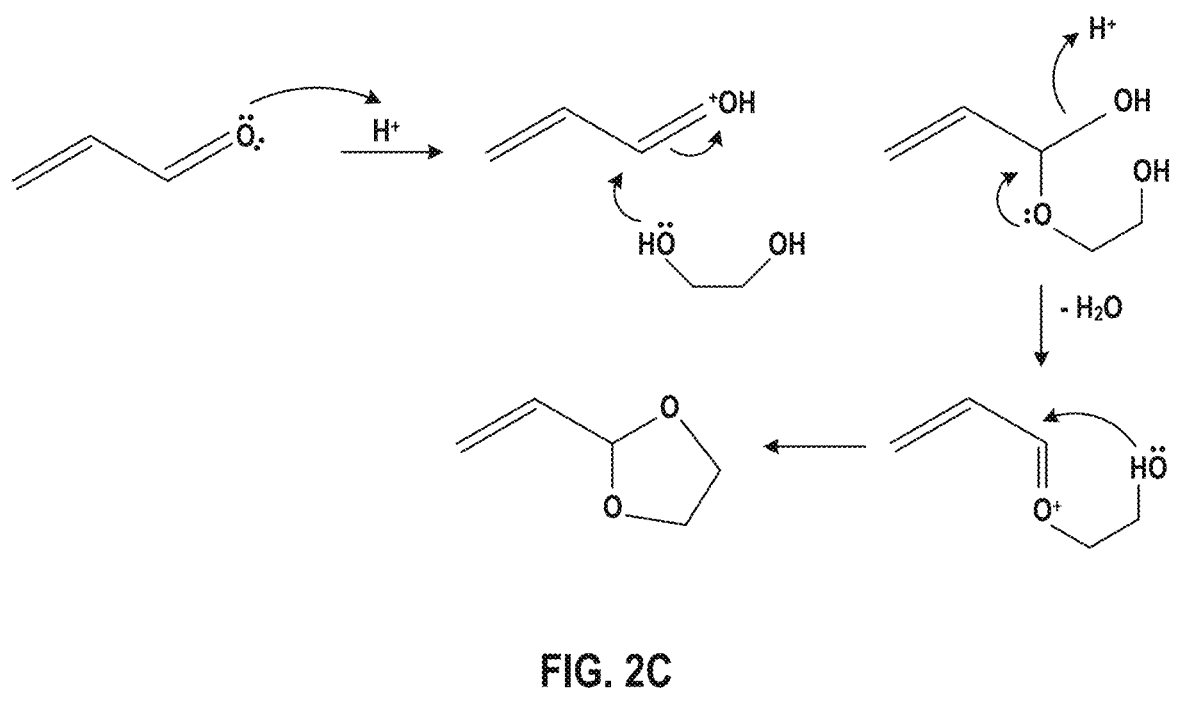

FIG. 2C is a simplified schematic illustrating a reaction scheme for forming the precursor scavenger material 108 from propenal and a diol, according to at least one embodiment of the disclosure. With reference to FIG. 2C, the diol may include ethylene glycol ($HOCH_2CH_2OH$). With reference to FIG. 2C, the carbonyl of the propenal may be protonated, followed by nucleophilic addition of the ethylene glycol to form a hemiacetal intermediate. The hemiacetal intermediate may be protonated at the hydroxyl group to form water by dehydration, as described with reference to FIG. 2A. The resulting structure may react with the second hydroxyl group of the diol to form a cyclic acetal. Accordingly, in some embodiments, the precursor scavenger material 108 comprises a cyclic acetal. In some embodiments, the precursor scavenger material 108 comprises a cyclic acetal including a 5-membered ring, where 2 of the members of the 5-member ring are oxygen atoms of the cyclic acetal. In some embodiments, the precursor scavenger material 108 comprises 2-vinyl-1,3-dioxolane, which is also referred to as acrolein ethylene glycol acetal or acrolein ethylene acetal.

After the precursor scavenger material 108 is introduced to the wellbore 102, the precursor scavenger material 108 may react downhole (e.g., in the wellbore 102, in the production tubing 110, in the production casing 118, in the earth formation 104) to form a scavenger material formulated and configured to react with sulfur-containing species, such as hydrogen sulfide and/or mercaptans. For example, when the precursor scavenger material 108 comprises an acetal (as described with reference to FIG. 2A through FIG. 2C). The precursor scavenger material 108 may hydrolyze in the presence of an acid (whether a Bronsted acid or a Lewis acid) and/or responsive to exposure to a pH lower than about 6.5, such as lower than about 6.0, to form propenal. In some embodiments, the precursor scavenger material 108 is exposed to an acid and water downhole to form the scavenger material. By way of non-limiting example, the precursor scavenger material 108 may be exposed to carbonic acid and water downhole. Responsive to such exposure, the precursor scavenger material 108 may react to form propenal and two alcohols (corresponding to $R_2$ and $R_3$ described above). In some embodiments, the formation of the scavenger material downhole proceeds in the opposite direction as that described above with reference to FIG. 2A through FIG. 2C.

Figures 2D, 2E:
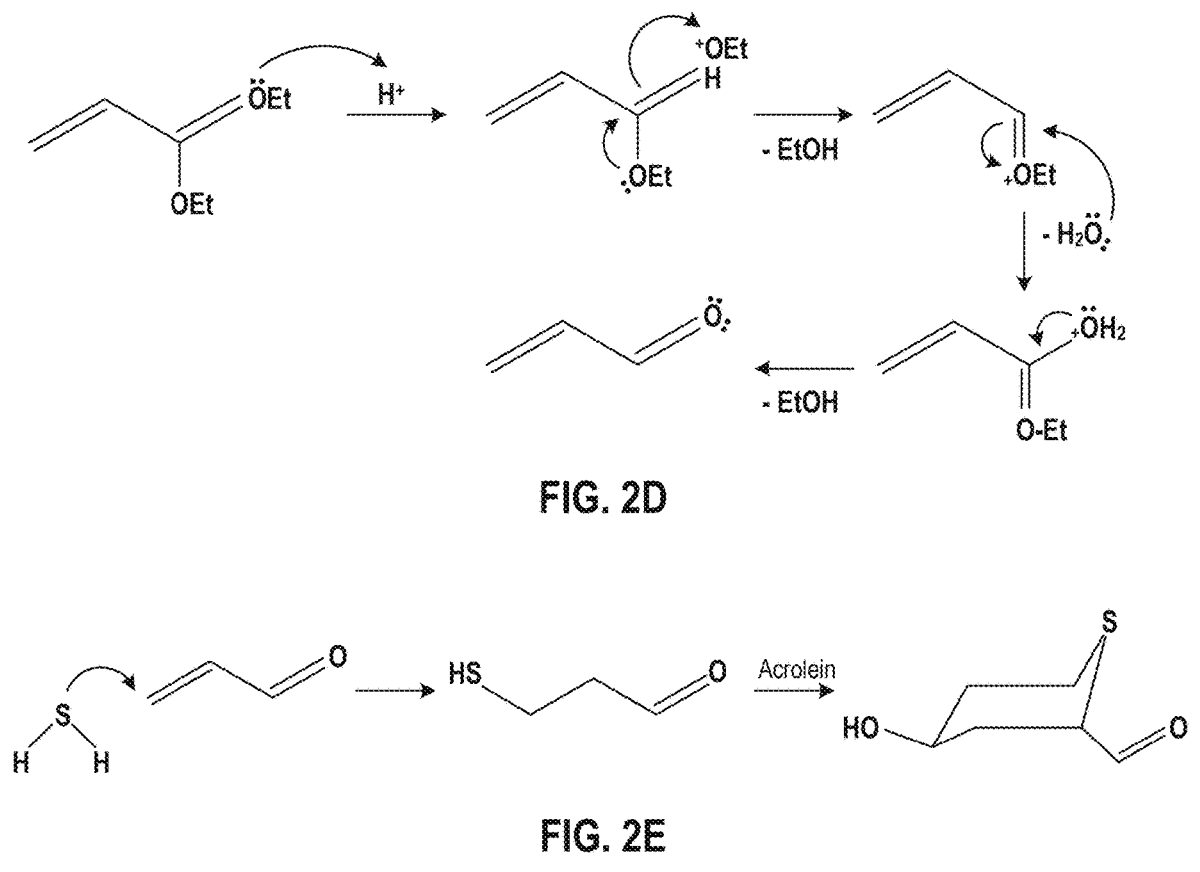

FIG. 2D is a simplified schematic illustrating a reaction scheme for forming propenal in-situ downhole from acrolein diethyl acetal, according to at least one embodiment of the disclosure. With reference to FIG. 2D, the acrolein diethyl acetal may be protonated in the presence of an acid. Responsive to protonation, an ethanol group may be removed to form an intermediate structure including a carbon to carbon double bond, after which water may react with the carbon to carbon double bond. Another ethanol group may be removed to form the propenal.

After forming the propenal in-situ, the propenal may react with sulfur-containing species in the wellbore 102, such as in wellbore fluids and/or produced fluids. FIG. 2E is a simplified schematic of a reaction scheme for reaction between propenal and hydrogen sulfide, which may occur within the wellbore 102. With reference to FIG. 2E, the weak nucleophile of the hydrogen sulfide may attack the β carbon atom (the terminal carbon atom of the carbon to carbon double bond). The resulting structure reacts with another propenal molecule to form a compound in which the sulfur from the hydrogen sulfide is bound in a ring structure. Accordingly, the propenal may scavenge the hydrogen sulfide and other sulfur-containing species.

While the precursor scavenger material 108 has been described and illustrated as including an acetal, the disclosure is not so limited. In some embodiments, the precursor scavenger material 108 comprises a hydroxy carbonyl compound, such as a β-hydroxy carbonyl compound. In some embodiments, the precursor scavenger material 108 comprises a reaction product of an Aldol reaction, wherein two carbonyl compounds (e.g., aldehydes and ketones) combine (react) to form a new β-hydroxy carbonyl compound. In some embodiments, the precursor scavenger material 108 comprises an aldol comprising a structure including a hydroxy group (—OH) two carbons away from an aldehyde or a ketone.

In some embodiments, the precursor scavenger material 108 comprises a reaction product of an aldehyde and a ketone. In some embodiments, the precursor scavenger material 108 comprises a reaction product of two aldehydes (e.g., a first aldehyde and a second aldehyde). The aldehyde may include one or more of formaldehyde (methanal), acetaldehyde (ethanal), propionaldehyde (propanal), butyraldehyde (butanal), isovaleraldehyde, or another aldehyde. By way of non-limiting example, one of the carbon compounds may be capable of being enolized and another of the carbonyl compounds may not be capable of being enolized. In some embodiments, the aldehyde and the ketone react in a crossed aldol reaction to form the precursor scavenger material 108, which may comprise a reaction product of an aldehyde and a ketone, or a reaction product of a first aldehyde and a second aldehyde.

Figure 3A:
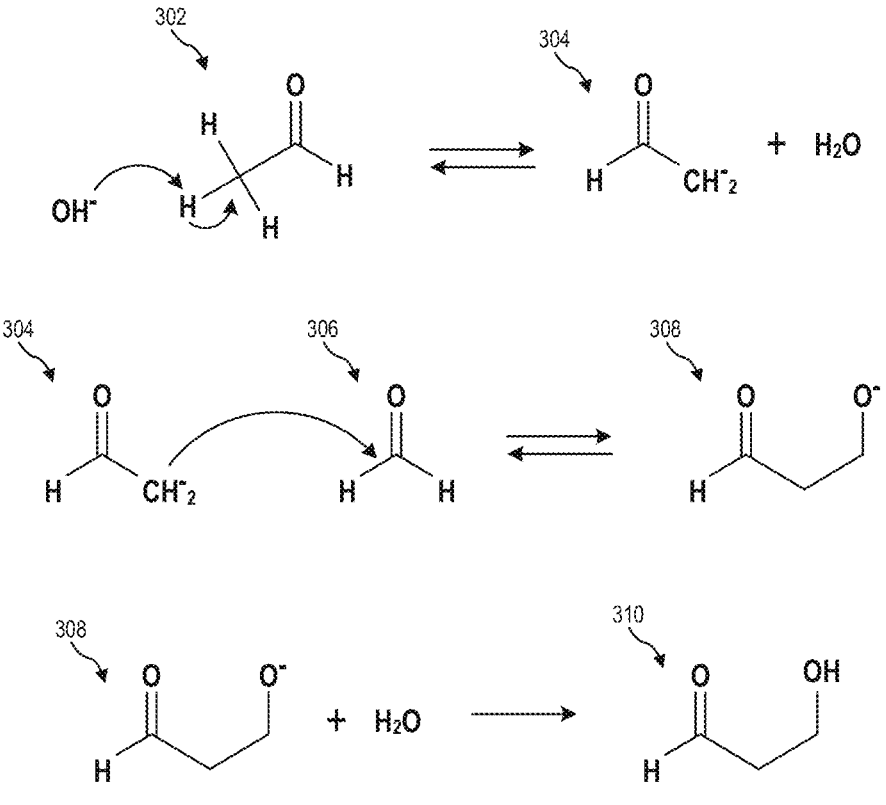
FIG. 3A is a simplified schematic illustrating a reaction scheme for forming a precursor scavenger material from formaldehyde and acetaldehyde to form 3-hydroxypropanal, according to at least one embodiment of the disclosure.

In some embodiments, at least one of the aldehydes comprises acetaldehyde. In some embodiments, at least one of the aldehydes comprises formaldehyde. In some embodiments, the aldehydes include formaldehyde and acetaldehyde and the reaction product includes 3-hydroxypropanal. FIG. 3A is a simplified schematic illustrating a reaction scheme for forming the precursor scavenger material 108 formaldehyde and acetaldehyde in an Aldol reaction to form 3-hydroxypropanal, according to at least one embodiment of the disclosure. The formaldehyde may react with the acetaldehyde to form the precursor scavenger material 108 comprising 3-hydroxypropanal.

For example, with reference to FIG. 3A, responsive to exposure to hydroxide ions, acetaldehyde 302 may form an enolate ion 304 and water. The enolate ion 304 may react with formaldehyde 306 to form an alkoxide ion 308. The alkoxide ion may react with water to form 3-hydroxypropanal 310.

In some embodiments, the precursor scavenger material 108 comprises a hydroxy carbonyl compound. In some embodiments, the hydroxy carbonyl compound includes a terminal carbonyl group at a first terminal portion of the hydroxy carbonyl compound, and a terminal hydroxyl group at a second terminal portion of the hydroxy carbonyl compound. The hydroxy carbonyl compound may include a hydroxyaldehyde having the general formula R—CH (OH)—CHO, wherein R is an alkyl group or hydrogen. The hydroxy carbonyl compound may include one or more of 3-hydroxypropanal, 4-hydroxybutanal, 5-hydroxypentanal, 6-hydroxyhexanal, 7-hydroxyheptanal, 8-hydroxyoctanal, 9-hydroxynonanal, or 10-hydroxydecanal. In some embodiments, the hydroxy carbonyl compound comprises 3-hydroxypropanal.

The precursor scavenger material 108 may react downhole in-situ to form the scavenger material after introduction of the precursor scavenger material 108 into the wellbore 102. The scavenger material may be formulated and configured to react with sulfur-containing species, such as hydrogen sulfide and/or mercaptans. For example, when the precursor scavenger material 108 comprises a hydroxy carbonyl compound (e.g., as described with reference to FIG. 3A), the precursor scavenger material 108 may react responsive to exposure to an acid or acidic conditions to form a scavenger material comprising an unsaturated aldehyde. The acidic conditions may include a pH lower than about 6.5, such as lower than about 6.0. In some embodiments, the precursor scavenger material 108 is exposed to an acid and water downhole to form the scavenger material. By way of non-limiting example, the precursor scavenger material 108 may be exposed to carbonic acid and water downhole. Responsive to exposure to such conditions, the precursor scavenger material 108 may react to form the scavenger material comprising the unsaturated aldehyde and water.

Figure 3B:
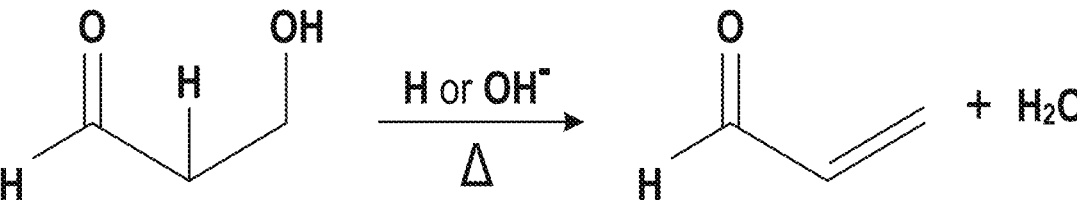
FIG. 3B is a simplified schematic illustrating a reaction scheme for forming acrolein from the 3-hydroxypropanal, according to at least one embodiment of the disclosure.

FIG. 3B is a simplified schematic illustrating a reaction scheme for forming propenal from the 3-hydroxypropanal, according to at least one embodiment of the disclosure. In some embodiments, responsive to exposure to acidic conditions and/or basic conditions, the 3-hydroxypropanal may be dehydrated to form the propenal and water.

Accordingly, the precursor scavenger material 108 may include one or more of an acetal having the general formula $R_1CH(OR_2)(OR_3)_2$, wherein $R_1$ is an organic group or hydrogen, and each of $R_2$ and $R_3$ are an organic group; a linear acetal, an acetal including a ring structure; a hydroxy carbonyl compound; a hydroxyaldehyde; or a reaction product of at least one of an aldehyde or a ketone and at least another of an aldehyde or a ketone (e.g., a reaction product of two aldehydes). In some embodiments, the precursor scavenger material 108 includes more than one compound. For example, the precursor scavenger material 108 may include a first type of acetal and a second type of acetal. In some embodiments, the precursor scavenger material 108 includes at least one type of acetal and at least one hydroxy-aldehyde. In some embodiments, the precursor scavenger material 108 comprises acrolein diethyl acetal and acrolein ethylene glycol acetal. In some embodiments, the precursor scavenger material 108 comprises 3-hydroxypropanal and an acetal, such as one or both of acrolein diethyl acetal and acrolein ethylene glycol acetal.

As described above, the precursor scavenger material 108 may be formulated and configured to react responsive to exposure to one or more conditions within the wellbore 102 to form the scavenger material. The one or more conditions within the wellbore 102 may include exposure to an acid and/or a pH lower than about 6.5, such as lower than about 6.0. The acid may include, for example, carbonic acid. In some embodiments, the precursor scavenger material 108 is formulated and configured to form a scavenger material comprising propenal in-situ responsive to exposure to the one or more conditions within the wellbore 102.

In embodiments where the precursor scavenger material 108 comprises an acetal, the precursor scavenger material 108 may react in-situ to form the scavenger material. The in-situ formed scavenger material may comprise an unsaturated aldehyde. In some embodiments, the scavenger material comprises propenal.

The scavenger material may be formulated and configured to react with (e.g., scavenge) sulfur-containing species downhole (e.g., within the wellbore 102, such as proximate the production tubing 110, the production casing 118, and/or proximate wellbore equipment; and/or within the earth formation 104). By way of non-limiting example, the scavenger material may include an unsaturated aldehyde. The sulfur-containing species may react with the scavenger material by acting as a weak nucleophile, such as by nucleophilic addition. For example, the sulfur atom of the sulfur-containing species (e.g., hydrogen sulfide) may act as a nucleophile and attach (via Michael addition) to the β carbon (e.g., the terminal unsaturated carbon) of the precursor scavenger material 108) to form a β-mercaptoaldehyde, which may include a thiol-aldehyde. In embodiments where the scavenger material comprises propenal, the reaction product of hydrogen sulfide and the propenal comprises 2-mercapto-ethanol ($HSCH_2CH_2CHO$).

Accordingly, the scavenger material that forms in-situ may be formulated and configured to reduce a concentration of the hydrogen sulfide and mercaptans located in the wellbore 102, in wellbore fluids (e.g., produced fluids), and the earth formation 104. The scavenger material may reduce corrosion of wellbore piping and equipment and may reduce the amount of hydrogen sulfide and mercaptans that are transported uphole to the surface 112.

Figure 4:
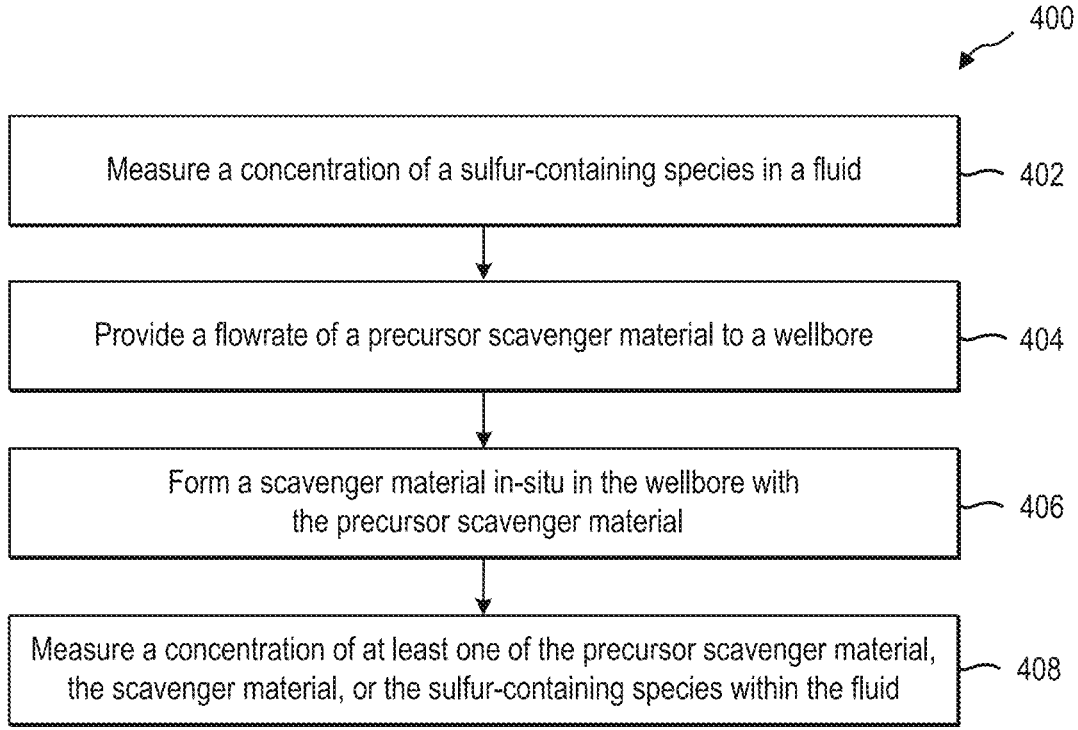
FIG. 4 is a simplified flow diagram illustrating a method of applying a precursor scavenger material to a wellbore, according to at least one embodiment of the disclosure.

FIG. 4 is a simplified flow diagram illustrating a method 400 of applying a precursor scavenger material to a wellbore, according to at least one embodiment of the disclosure. The method includes measuring a concentration of a sulfur-containing species in a fluid, as shown in act 402. The concentration of the sulfur-containing species may be measured downhole, such as within a wellbore 102. By way of non-limiting example, the concentration of the sulfur-containing species is measured with a sensor (e.g., sensor 142) located within the wellbore. In some embodiments, measuring the concentration of a sulfur-containing species includes measuring the concentration of the sulfur-containing species at the surface 112 (such as with sensor 148). In some embodiments, measuring the concentration of the sulfur-containing species includes measuring the concentration of more than one sulfur-containing species, such as measuring the concentration of hydrogen sulfide and the concentration of one or more mercaptans. In some embodiments, measuring the concentration of the sulfur-containing species includes measuring the concentration of the sulfur-containing species in a fluid, such as in a liquid, in a gas, or both, which may be located downhole or at the surface 112. In some embodiments, the fluid comprises a wellbore fluid, such as a produced fluid.

Responsive to measuring the concentration of the sulfur-containing species in the fluid, the method 400 further includes, based on the measured concentration of the sulfur-containing species, providing a flowrate of a precursor scavenger material to a wellbore, as shown in act 404. The flowrate of the precursor scavenger material may be determined based on the concentration of the sulfur-containing species measuring in act 402. The precursor scavenger material may include one or more of the materials described above. For example, the precursor scavenger material may include one or more of an acetal or a hydroxyaldehyde.

In some embodiments, the precursor scavenger material is provided to the wellbore neat, such as without a carrier fluid. The concentration of the precursor scavenger material may be greater than about 90.0 weight percent, such as greater than about 95.0 weight percent, or greater than about 99.0 weight percent. In other embodiments, the precursor scavenger material is provided to the wellbore with a carrier fluid. The carrier fluid may include, for example, an alcohol. The composition of the carrier fluid may facilitate the solubility of the precursor scavenger material in an aqueous phase or an oleaginous phase. For example, in embodiments where the carrier fluid comprises methanol or ethanol, the precursor scavenger material may be soluble in the aqueous phase. In embodiments where the carrier fluid comprises, for example, a $C_5$ or higher alcohol, the precursor scavenger material may be soluble in the oleaginous phase.

The method 400 may further include forming a scavenger material in-situ in the wellbore with the precursor scavenger material, as shown in act 406. In some embodiments, forming the scavenger material in-situ includes forming the scavenger material by reacting the precursor scavenger material in the wellbore, such as with an acid, with water, or in the presence of an acid and/or water to form the scavenger material. Reacting the precursor scavenger material to form the scavenger material may include contacting the precursor scavenger material with an acid and/or water. The in-situ formed scavenger material may include one or more of the materials described above and may be formed as described above with reference to formation of the scavenger material from the precursor scavenger material. In some embodiments, the scavenger material is formed in-situ in the wellbore responsive to one or more of exposure of the precursor scavenger material to a pH lower than about 6.5, exposure of the precursor scavenger material to an acid (e.g., carbonic acid), or exposure to water in the wellbore. In some embodiments, the in-situ formed scavenger material comprises propenal.

In some embodiments, the method 400 further includes measuring a concentration of at least one of the precursor scavenger material, the scavenger material, or the sulfur-containing species within the fluid (e.g., at the surface 112), as shown in act 408. In some embodiments, the concentration of the at least one of the precursor scavenger material, the scavenger material, or the sulfur-containing species of the fluid is measured at the surface 112. The fluid may include a produced fluid.

In some embodiments, act 408 includes measuring the concentration of the sulfur-containing species in the produced fluid at the surface 112. The concentration and/or the flowrate of the precursor scavenger material may be adjusted based on the measured concentration of the sulfur-containing species in the produced fluid at the surface 112. For example, responsive to measuring a concentration of the sulfur-containing species in the produced fluid at the surface 112 greater than a predetermined threshold, the method 400 may include increasing a concentration or a flowrate of the precursor scavenger material provided to the wellbore of act 404. In some embodiments, responsive to a concentration of the scavenger material in the fluid at the surface 112 being less than a predetermined threshold, the method 400 may include increasing a concentration or a flowrate of the precursor scavenger material provided to the wellbore of act 404.

Accordingly, the method 400 may include forming a sulfur-containing species scavenger material in-situ within a wellbore. Since the scavenger material is formed in-situ, the scavenger material may facilitate reducing a concentration of one or more sulfur-containing species within a fluid (e.g., a wellbore fluid, a produced fluid) without exposing operating personnel to the scavenger material. In addition, the scavenger material may comprise one or more materials that are not used in wellbore operations since the scavenger material is formed downhole.

The embodiments of the sulfur-containing scavenger material application system 106 including the precursor scavenger material 108, the sensor 142, and the sensor 148 have been primarily described with reference to wellbore operations; the sulfur-containing scavenger material application system 106 described herein may be used in applications other than the wellbore operations. In other embodiments, the sulfur-containing scavenger material application system 106 according to the present disclosure may be used outside a wellbore or other downhole environment used for the exploration or production of natural resources. Accordingly, the terms "wellbore," "borehole," and the like should not be interpreted to limit tools, systems, assemblies, or methods of the present disclosure to any particular industry, field, or environment. In addition, the wellbore fluids may be used in cased completion wellbores and in open hole completion wellbores.

The sulfur-containing scavenger material application system 106 may be used in wellbores used for hydrocarbon recovery, production of geothermal energy, injection of one or more chemicals into an earth formation and/or reservoir in the earth formation, carbon storage, or another purpose. In some embodiments, the sulfur-containing scavenger material application system 106 may be used for wellbores used for carbon capture, utilization, and storage (CCUS) and/or for recovery and use of geothermal energy.

Geothermal energy is a promising source of renewable energy that captures energy from heat generated within the earth. For example, geothermal energy may be used to heat structures (e.g., buildings) and/or to generate electricity (e.g., by heating water to generate steam and drive a turbine with the steam). The sulfur-containing scavenger material application system 106 described herein may be used to form wellbores used to circulate a fluid that is heated within the earth formation through which the wellbore extends. The heated fluid may be circulated to the surface where the captured heat may be recovered to heat a structure and/or generate electricity, followed by recirculation of the fluid to the earth formation to continue the cycle.

CCUS facilitates the capture, use, and/or storage of carbon (e.g., carbon dioxide), which has a goal of achieving carbon neutrality and/or net zero carbon emissions (NZE). CCUS may facilitate the capture of carbon dioxide from large point sources (e.g., power plants, refineries, cement plants, other industrial processing plants, or other industrial facilities that use fossil fuels, biomass fuels, or other fuels that generate carbon dioxide). The captured carbon dioxide may be converted into valuable products such as, for example, ethanol, sustainable aviation fuel, chemicals, and mineral aggregates. Alternatively, the carbon dioxide may be stored in geologic formations, such as in depleted hydrocarbon reservoirs. The carbon dioxide may be introduced into the earth formation through a wellbore that uses or used the sulfur-containing scavenger material application system 106 during operations or formation thereof.

EXAMPLES

Example 1

The scavenging efficiency of different precursor scavenger materials for scavenging hydrogen sulfide was measured. A test gas including hydrogen sulfide, carbon dioxide, and nitrogen was sparged through a sparger in a container including a precursor scavenger material. The test gas included 84 mL/minute of 1.5 volume percent hydrogen sulfide in nitrogen and 36 mL/minute of 10 volume percent carbon dioxide in nitrogen. The test gas flowed into the liquid, after which the outlet gas of the container was analyzed with a gas chromatograph (GC) to measure the concentration of hydrogen sulfide in the outlet gas. Before sparging the test gas through the container including the precursor scavenger material, the test gas bypassed the container and was directed to the gas chromatograph. After the piping was purged with the test gas for a duration, the test gas was sparged in the container to contact the precursor scavenger material.

Figure 5A:
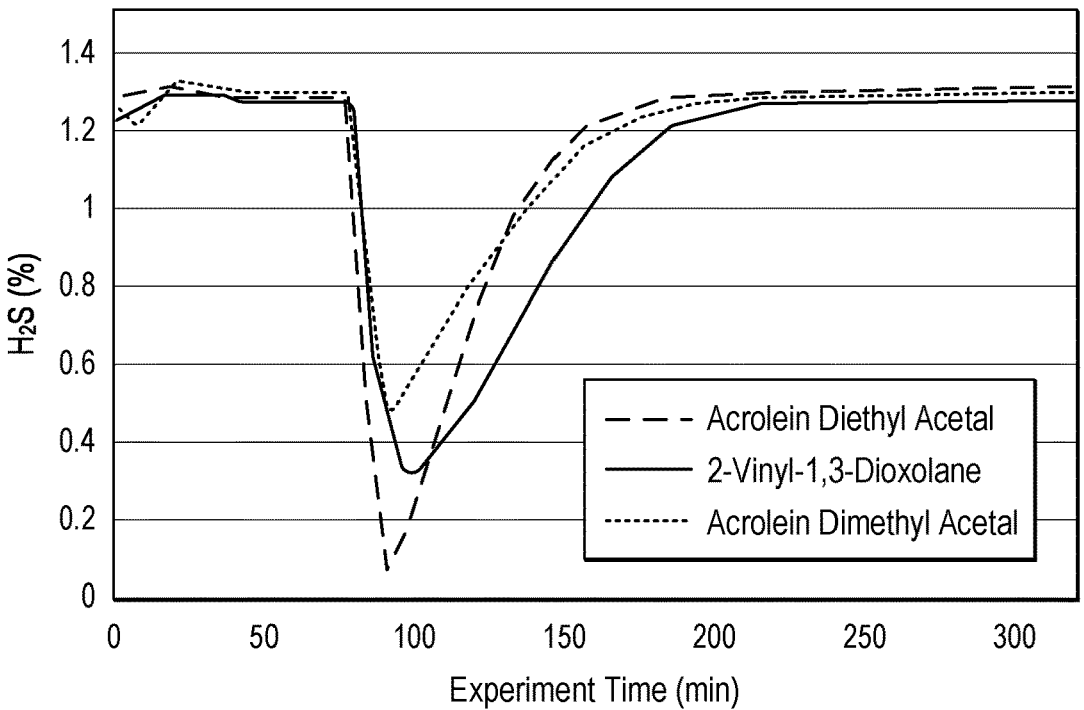
FIG. 5A is a graph illustrating the concentration of hydrogen sulfide in an outlet gas as a function of time when scavenging hydrogen sulfide using different precursor scavenger materials.

Three precursor scavenger materials were tested including acrolein diethyl acetal, 2-vinyl-1,3-dioxolane (also known as acrolein ethylene glycol acetal or acrolein ethylene acetal), and acrolein dimethyl acetal. FIG. 5A is a graph illustrating the concentration of hydrogen sulfide in the outlet gas as a function of time when using the different precursor scavenger materials; and FIG. 5B is a graph illustrating the concentration of carbon dioxide in the outlet gas as a function of time.

Figure 5B:
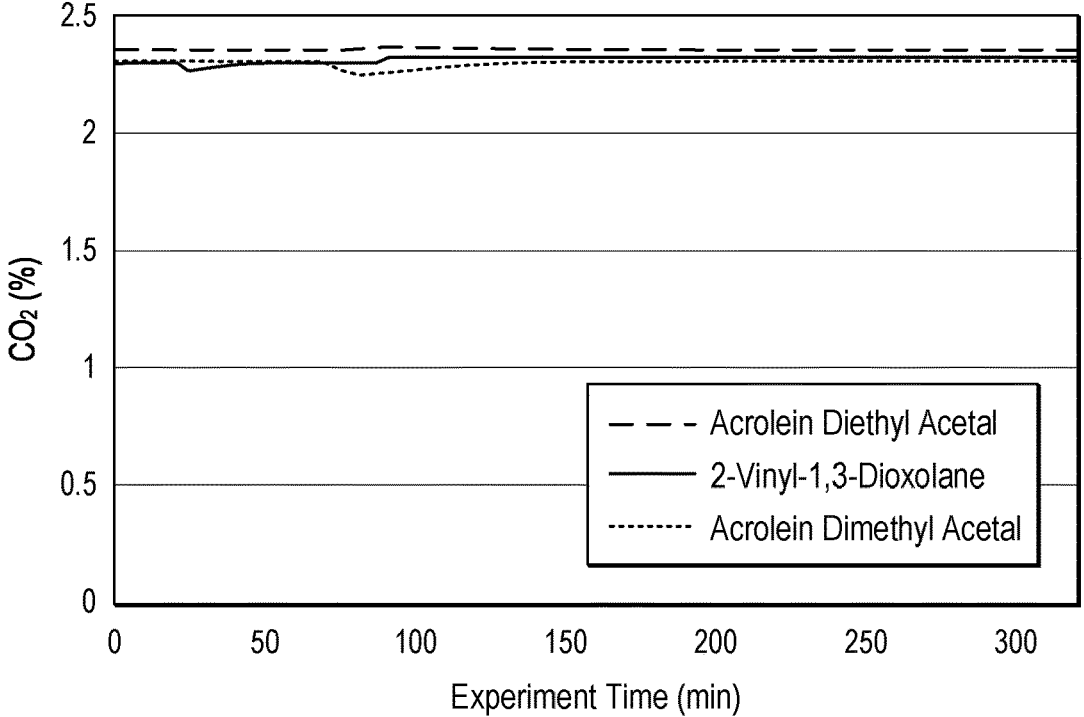
FIG. 5B is a graph illustrating the concentration of carbon dioxide in the outlet gas as a function of time when using the different precursor scavenger materials.

In FIG. 5A and FIG. 5B, the precursor scavenger materials were injected into the container after about 75 minutes, as can be seen in the decrease in the hydrogen sulfide concentration beginning at about 75 minutes. With reference to FIG. 5A, the concentration of hydrogen sulfide in the outlet gas initially decreased, and with reference to FIG. 5B, the concentration of carbon dioxide in the outlet gas was unchanged. Table 1 below shows the calculated hydrogen sulfide uptake of each of the precursor scavenger materials tested. Over the duration, the 2-vinyl-1,3-dioxolane decreased the concentration of the hydrogen sulfide the most. The acrolein diethyl acetal significantly decreased the concentration of hydrogen sulfide more than the acrolein dimethyl acetal.

TABLE 1

| Precursor scavenger material | Injection volume (mL) | Uptake (mg $H_2S$/mL scavenger) | |
| | | In first hour | Entire period |
| --- | --- | --- | --- |
| Acrolein diethyl acetal | 1 | 54.1 | 61.0 |
| 2-vinyl-1,3-dioxolane | 1 | 54.1 | 65.1 |
| Acrolein dimethyl acetal | 1 | 39.6 | 49.3 |

While the 2-vinyl-1,3-dioxolane exhibited slightly better uptake of the hydrogen sulfide than the acrolein diethyl acetal, precipitation was observed in the container including the 2-vinyl-1,3-dioxolane. The precipitates formed an insoluble polymeric-like substance on the surface of the test fluid. There were no solids observed for the acrolein diethyl acetal or the acrolein dimethyl acetal. Thus, the acrolein diethyl acetal and the 2-vinyl-1,3-dioxolane were determined to be effective hydrogen sulfide scavengers over short durations. The 2-vinyl-1,3-dioxolane exhibited slightly higher hydrogen sulfide uptake than the acrolein diethyl acetal over the entire test period but formed insoluble precipitates.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and/or within less than 0.01% of the stated amount. As another example, in certain embodiments, the terms "generally parallel" and "substantially parallel" or "generally perpendicular" and "substantially perpendicular" refer to a value, amount, or characteristic that departs from exactly parallel or perpendicular, respectively, by less than or equal to 15 degrees, 10 degrees, 5 degrees, 3 degrees, 1 degree, or 0.1 degree. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. It is also contemplated that various combinations or sub-combinations of the specific features and aspects of the embodiments described may be made and still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above.

What is claimed is:

1. A method for applying a scavenger material to a wellbore, the method comprising:
   providing a precursor scavenger material to a location within the wellbore, the wellbore extending through an earth formation, the precursor scavenger material comprising at least one of acrolein diethyl acetal, acrolein ethylene glycol acetal, or 3-hydroxypropanal;
   reacting the precursor scavenger material in the wellbore or the earth formation in-situ to form the scavenger material, the scavenger material comprising propenal; and
   reacting the scavenger material with at least one of hydrogen sulfide or a mercaptan to reduce a concentration of the at least one of hydrogen sulfide or the mercaptan.

2. The method of claim 1, wherein reacting the precursor scavenger material comprises contacting the precursor scavenger material with an acid to react the precursor scavenger material in the wellbore or the earth formation to form the scavenger material.

3. The method of claim 2, wherein contacting the precursor scavenger material with an acid comprises contacting the precursor scavenger material with carbonic acid.

4. The method of claim 1, wherein the precursor scavenger material comprises a reaction product of formaldehyde and another aldehyde.

5. The method of claim 4, wherein the another aldehyde comprises acetaldehyde.

6. The method of claim 1, wherein the precursor scavenger material comprises a reaction product of propenal and an alcohol.

7. The method of claim 1, wherein the precursor scavenger material comprises a reaction product of propenal and a diol and comprises a cyclic ring.

8. The method of claim 1, further comprising:
   measuring a concentration of the at least one of hydrogen sulfide or the mercaptan in the wellbore; and
   providing a concentration of the precursor scavenger material to the wellbore based on the measured concentration.

9. The method of claim 1, wherein forming the scavenger material comprises forming the scavenger material without exposing personnel to the scavenger material.

10. The method of claim 9, wherein a carrier fluid for the precursor scavenger material comprises an alcohol.

11. A method of applying a scavenger material to a wellbore, the method comprising:
   providing a precursor scavenger material to a location within the wellbore, the wellbore extending through an earth formation, the precursor scavenger material comprising at least one of acrolein diethyl acetal, acrolein ethylene glycol acetal, or 3-hydroxypropanal;
   responsive to exposure to an acid or water in the wellbore, forming the scavenger material in the wellbore from the precursor scavenger material, the scavenger material comprising propenal;
   measuring a concentration of a sulfur-containing species associated with the wellbore; and
   adjusting a flowrate of the precursor scavenger material based on the measured concentration of the sulfur-containing species at a downhole location.

12. The method of claim 11, wherein measuring a concentration of a sulfur-containing species associated with the wellbore comprises measuring the concentration of the sulfur-containing species downhole.

13. The method of claim 11, wherein measuring a concentration of a sulfur-containing species associated with the wellbore comprises measuring the concentration of the sulfur-containing species in a produced fluid.

14. The method of claim 11, wherein forming the scavenger material in the wellbore from the precursor scavenger material comprises exposing the precursor scavenger material to carbonic acid in the wellbore.

15. A system for providing a scavenger material to a wellbore, the system comprising:
   an injection pump in fluid communication with a precursor scavenger material, the precursor scavenger material comprising at least one of acrolein diethyl acetal, acrolein ethylene glycol acetal, or 3-hydroxypropanal; and
   wellbore piping in fluid communication with the injection pump and configured to provide the precursor scavenger material to a downhole location.

* * * * *